Patented Apr. 23, 1940

2,197,853

UNITED STATES PATENT OFFICE 2,197,853

SEXUAL HORMONES AND METHOD OF PREPARING THEM

Wilhelm Dirscherl, Frankfort-on-the-Main, and Fritz Hanusch, Heidelberg, Germany, assignors to Rare Chemicals Inc., Nepera Park, N. Y., a corporation of New York No Drawing. Application November 17, 1936, Serial No. 111,330. In Germany November 18, 1935

13 Claims. (Cl. 260—397)

Our invention relates to substances acting as sexual hormones and especially to substances having the activity of a male sexual hormone as well as of a corpus luteum hormone. It deals especially with the manner of preparing such substances in a new and a more efficient way than it was possible up till now. Other objects will hereinafter appear.

As it is well known to those skilled in the art, there have been attempts to oxidize cholestenone by chromic acid in an acid medium. Inasmuch as these experiments were carried through in the cold they did not succeed at all; on working in the warmth it was stated that after a consumption of 6 atoms oxygen 50–60% cholestenone were unattacked. No oxidation products whatever have been isolated.

We have found that hormone like acting substances can be obtained by treating cholestenone in the acid or neutral medium by oxidizing agents. The substances are prepared by separating after the oxidation the reacting mixture from inefficient, acid and volatile components and from unchanged initial material and by concentrating, purifying and isolating in the manner usual in preparing sexual hormones.

As initial materials are taken into account the pure cholestenone, obtained for instance from cholesterol by halogenation, oxidation and dehalogenation or mixtures containing this substance, obtained, e. g., from wool fat in an analogous manner.

Oxidation may be carried out by oxidizing agents especially vigorously acting oxidizing agents, particularly by metal compounds rich in oxygen as, e. g., chromic acid, also called chromic anhydride, permanganic acid, acetate of tetravalent lead Pb(OCOCH₃)₄, further by acids which are derived from hydrogen peroxide as, e. g., peracetic acid.

Concentrated nitric acid is not suitable as an oxidizing agent. The reaction is carried out preferably in the presence of diluents especially of organic character, as, e. g., glacial acetic acid or strong acetic acid. Oxidation by electrolysis may also be taken into account whereby the above named metal compounds can act as oxygen transporters.

Oxidation may be executed at room temperature as well as at higher temperatures, preferably at temperatures between 30–70° C., temperatures between 70–100° C., and by special conditions e. g. in case of a suitable dilution or a very short reaction time, temperatures above 100° C. may also be used. It is recommended to take care of a good thorough mixing of the oxidizing agent with the reaction mixture containing the substance to be oxidized which can take place by stirring or eventually by adding emulsifying substances.

After having finshed the oxidation an excess of the oxidant, if any, is destroyed by means of easily oxidizable substances, as for example methanol, formic aldehyde, sulphurous acid and so on.

The solvent is now removed by distillation for instance, after neutralising the mixture, preferably in vacuo. The remaining mixture of substances is separated from inorganic components by means of water, whilst the organic components containing the active substances are taken up by a suitable organic solvent e. g. ether.

For removing inactive organic substances of acid reaction, the solution is now treated, suitably in the presence of water, by neutralising agents as for instance caustic alkali, alkaline earth, ferric hydrate and so on and by eliminating the salts thus obtained. Afterwards the inactive volatile components are distilled in vacuo or with a suitable vapor as a carrier as for instance water vapor. In some cases the sequence of removing the acid and volatile reaction components may also be reversed.

The product thus obtained, a brownish oil, shows a strong male hormone like activity and at the same time the activity of a corpus luteum hormone.

For further purification, still existing inactive substances, especially unattacked cholestenone, are separated from the active substances. This can be carried out preferably by the following ways:

1. By separation by means of fractional crystallisation from suitable solvents preferably at low temperatures;

2. By treating with adsorption agents as, e. g., alumina or bleaching clay; by acting in this manner the hormone acting substance remains as a rule fixed on the adsorption agent whilst the initial material, the cholestenone, is substantially removed without any difficulty by a thorough washing;

3. By distributing amongst two solvents as, e. g., ligroin and an aqueous alcohol;

4. By treating with ketone reagents as, e. g., hydroxylamine, hydrazines, especially simple or substituted phenyl hydrazines, semicarbazide, derivatives of aminoacethydrazide and so on, the addition compounds thus formed being separated by one of the methods 1–3.

Especially commendable are combinations of the said methods particularly the combination of fractional crystallisation together with following adsorption.

5. After removal of the initial material particularly on working by adsorption methods, the active substances showing a ketone character may be obtained by distillation or sublimation in high vacuo and in some cases by subsequent recrystallisation or by combination of the three methods. A product is thus obtained which shows at the same time the activity of a male sexual hormone and of a corpus luteum hormone. By repeated application of the mentioned purification methods, as, for instance, sublimation in high vacuo and fractional crystallisation, division in two fractions, one of them being enriched by the substance showing the activity of a male hormone and the other by the substance showing the activity of a corpus luteum hormone and, finally a separation rather complete of the two hormone substances may be attained.

Instead of concentrating the active ketones themselves by sublimation in high vacuo and so on in some cases it seems to be commendable to prepare first the addition compounds with ketone reagents. Substances giving colored addition compounds as, e. g., nitro-phenylhydrazines are particularly suitable reagents because the reaction mixture thus obtained can be divided by means of the chromatographical adsorption method by Tswett (see: "Berichte d. deutschen botan. Gesellschaft" vol. 24 (1906) page 234, further, the monograph of Palmer: Carotinoids and related pigments, New York; The Chemical Catalog Co. (1922).) in fractions containing a male hormone active component and a corpus luteum hormone active component. After liberating the adsorbed compounds by eluting liquids as, e. g., alcohols, ether, chloroform, acetone, dioxane, and splitting off the ketone reagents, the pure substances may be obtained by the above mentioned methods of distillation and sublimation in high vacuo and in some cases by recrystallisation. The working up by means of reagents giving colored compounds in connection with the chromatographical adsorption method following afterwards may also be applied when the initial material is not yet or only partly removed. In these cases several colored adsorption zones may be stated according to which unchanged initial material and other inefficient reaction components may be separated from the active substances and in some cases also the male acting from the corpus luteum hormone acting substance.

The decomposition of the addition compounds is carried out in the usual manner by dilute acids, particularly by dilute oxalic acid, whereas the subsequent purification of the product thus obtained is effected for instance by sublimation in high vacuo as above described.

*Example 1.*—A solution of 40 g. cholestenone in 2000 cc. glacial acetic acid is heated in a round-bottomed flask at about 50° C. Into this solution a solution of 67 g. chromic acid in a mixture of 160 cc. glacial acetic and 20 cc. water is allowed to flow in slowly by stirring the whole mixture. After the oxidation an excess of chromic acid, if any, is destroyed by addition of methanol and the glacial acetic acid is distilled off in vacuo; the remaining reaction mixture is taken up with water and shaken several times with ether. The etheral extract is washed with water, with a dilute solution of caustic soda and once more with water; the ether is then removed by distillation. The residue is now freed from volatile substances by a distillation with water vapors and the remainder shaken out with ether. The etheral solution is dried with sodium sulfate and freed from ether by distillation. The remaining product is a brownish oil, soluble in alcohols, chloroform, ether, benzene, ligroin, sesame oil, slightly soluble in water, having the activity of a male sexual hormone and of a corpus luteum hormone. The amount of the hormonal activity depends on the quantity of inactive byproducts particularly of unconverted initial material. As a rule the capon's comb unit according to Fussgänger (see: "Med. und chem. Abhandlungen der med. chem. Forschungsstätten der I. G. Farbenindustrie," vol. 2, (1934) pages 194–204) is contained in about 150–300 γ, the seminal vesicle unit according to Loewe und Voss (see: "Klinische Wochenschrift", vol. 9, page 481) in about 0.75–1.5 mg., the corpus luteum hormone unit (tested on the rabbit; see: Corner and Allen, "Amer. Journ. Physiol.," vol. 88, page 326) about 150–300 mg. Products of less and sometimes of more activity may also be obtained.

By removing the inactive byproducts especially the still existing cholestenone the activities can attain a five fold, a ten fold and even a higher value and they may be approximated to the values of pure male sexual hormone substances and pure corpus luteum hormone substances.

To attain this purification, several methods may be applied. For instance the product is allowed to cool in a refrigerator, whereby the main part of the initial material forms crystals which may be separated by sucking them off. The filtrate is diluted with alcohol; an alcoholic solution of semicarbazide acetate is added and the mixture is heated on the water bath for half an hour. The precipitating mixture, consisting essentially or entirely of the semicarbazone of the still existing cholestenone and of semicarbazones of the active substances is separated by fractional crystallisation. The active ketones may be obtained from the semicarbazones by decomposing the latter by means of dilute acids as for instance by dilute oxalic acid. By fractional sublimation or other suitable methods they may be separated in a fraction having the activity of a male sexual hormone and a fraction of a corpus luteum hormone.

Instead of purifying by means of ketone reagents, a further treatment may also be carried out by adsorption methods while the main part of unchanged cholestenone has been removed by refrigerating. On applying alumina or bleaching clay, inactive substances particularly the initial material are not adsorbed or only in a feeble manner so that they can be removed by washing out with the same solvent in which the product is dissolved whilst the active substances remain adsorbed and can be removed by special washing liquids. The mixture of substances dissolved in benzene, toluene, xylene or a similar solvent is for instance adsorbed on a column of alumina of loose texture filled, e. g., in a wide glass tube. Benzene or one of the other mentioned solvents is sucked through the adsorption mixture until the filtrate substantially leaves on evaporating no residue of inactive substances. The active substances are now liberated from the adsorbent by suitable eluting liquids as for instance alcohols, particularly methanol, ether, chloroform, acetone. The product remaining after evaporating of the eluting liquid may be decomposed by means of a dilute acid and the active substance further treated as above described.

When using as ketone reagents substances yielding colored addition compounds, as, e. g., 2.4-dinitro-phenyl-hydrazine, the formed dinitrophenylhydrazones are dissolved in a suitable solvent and divided in fractions by the chromatographical adsorption method. To this end the solution containing the hydrazones is adsorbed on a column of bleaching clay and separated by "developing" into different colored zones. By sectioning the column according to the different colored zones the inactive substances can be separated from the active substances and in some cases also the substance acting as a male sexual hormone from the substance acting as a corpus luteum hormone.

The several parts of the column are then treated with suitable eluents, the substances thus liberated decomposed by a dilute acid and further treated for instance by sublimation in high vacuo and fractional recrystallization as above mentioned.

*Example 2.*—A solution of 40 g. cholestenone in 2000 cc. glacial acetic acid is heated in a round-bottomed flask at about 30° C. Into this solution are dropped by stirring it 3600 g. of a 5% aqueous solution of potassium permanganate and 750 g. 20% sulfuric acid, each solution by itself or both of them as a mixture. After the oxidation the reaction mixture is treated as described in Example 1.

*Example 3.*—A solution of 40 g. cholestenone in 2000 cc. glacial acetic acid is treated at 40–50° C. by constant stirring with a solution of 216 g. acetate of tetravalent lead in 800 cc. glacial acetic acid. The oxidation mixture thus obtained is worked up as described in Example 1.

*Example 4.*—A solution of 40 g. cholestenone in 1000 cc. benzene is shaken in a bottle for several days at a room temperature with 1600 cc. of a 5% solution of potassium permanganate and 350 cc. 20% sulfuric acid. After the oxidation, the dioxide of manganese thus formed is reduced by sulfurous acid and the reaction mixture worked up as described in Example 1.

*Example 5.*—40 g. cholestenone dissolved in 1000 cc. glacial acetic acid are added to a solution of 200 g. chromic acid in 100 cc. water and 900 cc. glacial acetic acid in such a manner that the two solutions drop substantially at the same time on a rotating glass rod which causes them to react and to flow directly into cold water. By this method a particularly short reaction time is obtained. When the two solutions have entirely reacted together, an excess of the oxidizing agent, if any, is removed by means of formic aldehyde; the considerably diluted solution is now evaporated and the remainder is further treated as described in Example 1.

Various changes may be made in the details disclosed in the foregoing specification without departing from the invention or sacrificing the advantages thereof.

In the claims affixed to this specification no selection of any particular modification of the invention is intended to the exclusion of other modifications thereof and therefore no limitations are intended other than those imposed by the claims.

We claim:

1. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide.

2. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide and separating the produced active substances from the reaction mixture.

3. The process of producing hormone like substances having the activity of a male sexual hormone as well as of a corpus luteum hormone which consists of treating cholestenone by oxidizing agents consisting of the group including oxygen compounds of metals containing large amounts of available oxygen, compounds of tetravalent lead and acids derived from hydrogen peroxide and separating the produced active substances from the reaction mixture.

4. The process according to claim 1 of producing hormone like substances having the activity of a male sexual hormone as well as of a corpus luteum hormone which consists of carrying out the oxidation by means of chromic acid.

5. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide, removing from the reaction mixture the acid components by neutralising agents, the volatile components by distillation and separating the produced active substances from the reaction mixture.

6. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide, removing from the reaction mixture the acid components by neutralising agents, the volatile components by distillation and separating the produced active substances from the reaction mixture by fractional crystallisation at low temperatures.

7. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide, removing from the reaction mixture the acid components by neutralising agents, the volatile components by distillation and separating the produced active substances from the reaction mixture by adsorption agents.

8. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide, removing from the reaction mixture the acid components by neutralising agents, the volatile components by distillation and treating the product thus obtained with ketone reagents.

9. The process of producing hormone like substances having the activity of a male sexual hormone as well as of a corpus luteum hormone which consists of treating a mixture containing cholestenone by oxidizing agents consisting of the group including oxygen compounds of metals containing large amounts of available oxygen, compounds of tetravalent lead and acids derived from hydrogen peroxide, removing from the reaction mixture the acid components by neutralising agents, the volatile components by distillation and treating the product thus obtained with ketone reagents, and separating the formed addition products by fractional crystallisation from the reaction mixture.

10. A new hormone product, an oxidation product of cholestenone, a brownish oil of ketone character, soluble in alcohols, chloroform, ether, glacial acetic acid, benzene, ligroin, sesame-oil, slightly soluble in water, having the activity of a male sexual hormone on the capon's comb and on the seminal vesicle of the mouse as well as of a corpus luteum hormone.

11. A hormone-like substance having the activity of a male sexual hormone and of a corpus luteum hormone derived from substances containing cholestenone by oxidizing agents consisting of the group including oxygen compounds of metals containing large amounts of available oxygen, compounds of tetravalent lead and acids derived from hydrogen peroxide.

12. A hormone-like substance having the activity of a male sexual hormone and of a corpus luteum hormone derived from substances containing cholestenone by chromic acid.

13. A hormone-like substance having the activity of a male sexual hormone and of a corpus luteum hormone derived from substances containing cholestenone by permanganic acid.

WILHELM DIRSCHERL.
FRITZ HANUSCH.